June 12, 1945.   V. VAN BUREN   2,378,370

FISH LURE

Filed April 13, 1944

Inventor
Violet Van Buren
By Munn, Liddy & Glaccum
Attorneys

Patented June 12, 1945

2,378,370

UNITED STATES PATENT OFFICE 2,378,370

FISH LURE

Violet Van Buren, Carlsbad, N. Mex.

Application April 13, 1944, Serial No. 530,759

5 Claims. (Cl. 43—45)

This invention relates to improvements in fish lure.

An object of the invention is the provision of a lure formed of wood or plastic in such a manner that it will travel through the water in an upright manner with a spinner so arranged in an opening in the body of the lure that it will give to the lure a natural swimming motion when passing through the water.

Another object of the invention is the provision of a fish lure having an elongated body with the upper portion of the body being wider than the lower portion with the side walls tapering gradually from the wide upper portion to the bottom edge, said body being provided with a central opening in which is located a spinner formed of one piece of metal and mounted on a rod extending vertically of the body, and a spoon extending downwardly and outwardly from the forward end and provided with an extension adapted to be secured to the lower edge of the body.

A further object of the invention is the provision of a lure having a spinner mounted on an axle and formed of a single piece of metal and adapted to be revolved within a substantially centrally located opening in the body, said spinner having a central slot, and a slot located adjacent each end of the first mentioned slot to provide strips of metal which form bearings for the spinner.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

Figure 1:
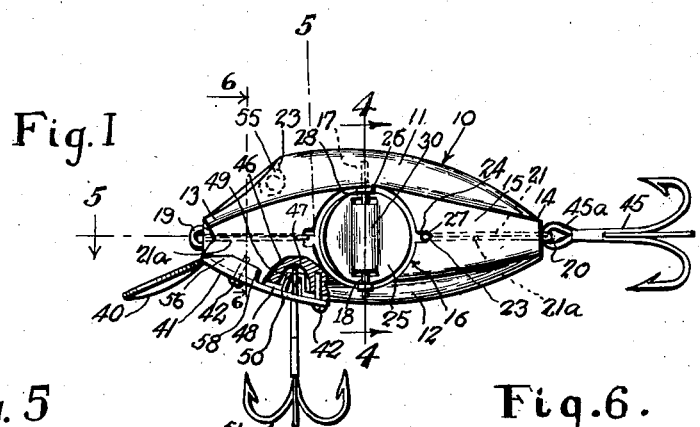
Fig. 1 is a longitudinal side view of a fish lure constructed according to the principles of my invention.

Referring more particularly to the drawing, 10 generally designates a body which may be formed of any suitable material, such as wood or a plastic, and which simulates a fish.

Figure 4:
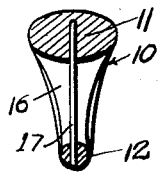
Fig. 4 is a vertical section taken along the line 4—4 of Fig. 1, with the spinner removed.

As shown more particularly in Fig. 4, the upper portion 11 is relatively wide, as compared with the lower portion 12. It will be seen that the side walls of the body are tapered inwardly from the top 11 to the bottom 12. The body has a greater length than width as shown in Fig. 1 and the body tapers from an intermediate portion toward its opposite ends 13 and 14.

The gradually reduced portion 15 of the body is provided with a circular opening 16 which opens through the side walls of the body. A rod 17 is mounted in a vertical manner in the body so that a portion of this rod as shown at 18 spans the opening 16. This rod is at its upper end and the lower end embedded in the material of said body.

Figure 3:
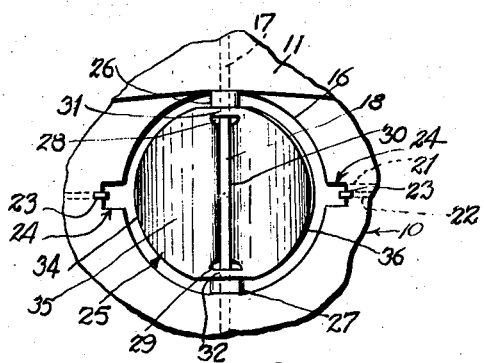
Fig. 3 is a fragmentary enlarged view of the body showing the construction of the spinner.

A spinner generally designated by the numeral 25 is rotatably mounted on the portion 18 of the rod 17 as shown more particularly in the enlarged view in Fig. 3. This spinner is made from a piece of flat metal, and is cut substantially round to fit within the opening 16 of the body 10, although the diameter of the spinner is less than the diameter of the opening to permit the insertion of washers 26 and 27, which are located between the wall of the circular opening and diametrically disposed parts of the spinner 25. The spinner is provided with slots 28 and 29 diametrically disposed, and a depression 30 to receive the rod or axle 17. The slots 28 and 29 form a pair of narrow strips 31 and 32 to provide partial bearings for the spinner. The depression 30 cooperates with the strips 31 and 32 to complete the bearings for said spinner. The rod 17 is inserted between the pairs of strips 31 and 32 and the depression. It will be noted that one portion 34 of a wing 35 of the spinner is reduced and turned outwardly in one direction from the face of the spinner, while the diametrically disposed portion 36 is bent in the opposite direction.

The spinner mounted between the washers 26 and 27 is free to rotate on the rod 17 when the lure is drawn through the water.

A spoon or activating member 40 is cup-shaped and is provided with an extension 41 extending inwardly from the inner end of the spoon and is secured by means of screws 42 to the bottom forward edge of the body 10. The extension is widened as shown at 43 and an opening 44 is formed in the wide portion of the extension. Said extension is curved to conform to the bottom edge of the body 10. The spoon and the spinner 25, together with the shape of the body, will cause the lure to travel through the water in a manner corresponding substantially to the swimming motion of a minnow.

Figure 2:
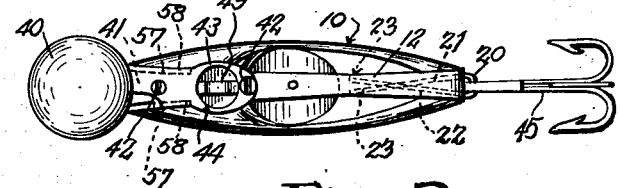
Fig. 2 is a bottom plan view of the same with a hook removed.

A line is adapted to be connected to an eye 19 at the forward end of the body. A hook, generally designated by the numeral 45 has its inner end 45a received by an eye 20 on the rear end of the body, and this hook is adapted to travel horizontally when the lure is drawn through the water. The eye 20 as shown in Fig. 2 is formed at one end of a hook which has its legs 21 and 22 crossed and formed of spring metal with fingers 23 at the ends to grip the walls of the pocket formed in the body 10. The hooks are inserted in position by pressing the legs 21 and 22 together. A pocket 46 shown in Fig. 1 extends from the opening 44 in the extension 41 of the spoon 40 and inwardly of the body so that the inner end 47 of the pocket will be below the inner end of the eye 19 which is identical in construction with the eye 20 and is inserted in position in a similar manner so that the fingers 23 will engage the walls of the pocket 24 and lock the hook against displacement.

A metallic strip 48 has its ends countersunk in the bottom of the body, and these ends are secured in place by the screws 42. The intermediate portion 49 of the strip is bent to receive an eye 50 on the inner end of a hook 51 which swings downwardly from the body 10.

In assembling the lure, it is not necessary to employ a template since the openings in the extension 41 of the spoon 40, when the spoon is placed in the position shown in Fig. 1, will guide the manufacturer in placing the screws 42 in position. Furthermore, the outer end of the pocket will aid in positioning the spoon, since the outer end of the pocket will be alined with the opening 44 in the extension 41.

Figure 5:
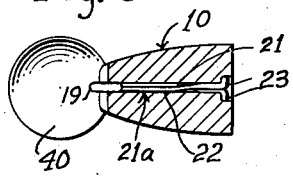
Fig. 5 is a horizontal section taken along the line 5—5 of Fig. 1.
Figure 6:
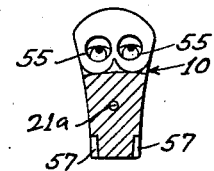
Fig. 6 is a vertical section taken along the line 6—6 of Fig. 1.

The eyes 19 and 20 are especially constructed as shown in Fig. 5. They are formed of a single strip of spring wire bent intermediate the ends to provide an eye and legs 21 and 22 crossing each other with outturned ends. The free ends of the legs are pressed towards each other when the eyes 19 and 20 are inserted through the passages 21a in the opposite ends of the body. When the legs are pressed toward each other the fingers 23 will be alined and the passages 21a have sufficient diameters to permit the inserting of the fingers. When the links on hooks 19 and 20 are forced sufficiently inwardly the fingers 23 will snap into place in the pockets 24. Since these pockets are cut inwardly from the wall of the circular opening 16 the fingers 23 will be out of the way of the periphery of the spinner. The opposite ends of the passages 21a are flared to facilitate the insertion of the links 19 and 20.

The body itself is particularly shaped so that said body will ride in an upright position through the water. The upper end of the body is relatively wide when compared with the lower edge 12 and the side walls taper from the top at the upper edge of the opening 16 to the bottom edge. It will also be noted that the body is also tapered from the central opening toward its opposite ends, not only along the top and bottom edges, but at the side walls.

In order to further simulate a fish, artificial eyes 55 are embedded in the front portion of the body.

The extension 41 of the activating member 40 has inturned flanges 56 which are set in recesses 57 formed in the side walls of the body 10 adjacent the forward section of the lower portion 12. The recesses form shoulders 58 against which the inner ends of the flanges 56 abut. When the activating member is applied to the body, the shoulders when engaged by the inner ends of the flanges will so position the extension that the screws 42 will aline directly with threaded openings in the body and may be screwed in place. By this construction, it will not be necessary to employ a template to define the position of the activating member when it is secured to the body.

I claim:

1. A fish lure, comprising a body member provided with longitudinally alined passages and a transverse circular passage, intermediate the ends of said body, an axle located in the transverse passage and diametrically traversing said passage, a spinner rotatably mounted on that portion of the axle which traverses the circular passage, a link removably mounted in each longitudinal passage, a fish hook connected with one link at one end of the body, said body having a vertically disposed pocket leading inwardly from the lower edge of the body, means in said pocket for suspending a fish hook below the body, and a spoon projecting downwardly from the other end of the body at an angle to the horizontal, said body being broader at the top than at the bottom edge and gradually tapering transversely from the top adjacent the upper edge of the circular passage to the bottom edge.

2. A fish lure, comprising a body broader at the top than at the bottom edge and provided with a substantially circular passage opening through the opposite sides of said body, said body tapering transversely from the upper edge of the passage to the bottom edge of said body, said body also tapering from intermediate points to the opposite ends thereof, a spinner mounted in a vertical plane in the circular passage, a fish hook connected to one end of the body and a hook suspended from the lower edge of the body and adjacent the other end of said body.

3. A fish lure, comprising a body broader at the top than at the bottom edge and provided with a substantially circular passage opening through the opposite sides of said body, said body tapering transversely from the upper edge of the passage to the bottom edge of said body, said body also tapering from intermediate points to the opposite ends thereof, a rod mounted vertically in the body and extending diametrically of the circular passage, a spinner rotatably mounted on the rod and within the passage, a removable link at one end of the body, a fish hook movably connected to the link, a fish hook supporting means between the passage and the other end of said body, a fish hook movably suspended from the supporting means below the lower edge of the body, and a spoon projecting forwardly and downwardly from an end of the body adjacent the last-mentioned fish hook.

4. A fish lure, comprising a body broader at the top than at the bottom edge and provided with a substantially circular passage opening through the opposite sides of said body, said body tapering transversely from the upper edge of the passage to the bottom edge of said body, said body also tapering from intermediate points to the opposite ends thereof, a rod mounted vertically in the body and within said passage, a spinner rotatably mounted on the rod and within the passage, a fish hook having connections with one end of the body, a spoon projecting outwardly from the body adjacent the other end of the rod, having an inward extension secured to the bottom edge of the body, and provided with an opening, said body having a pocket extending inwardly from the opening in the extension, and a metal strip secured to the bottom edge of the body and located between the extension and said edge, the intermediate portion of strip being bent inwardly into said pocket and receiving an eye on a fish hook.

5. A fish lure having an elongated narrow body, said body being provided with a transverse passage, a spinner rotatably mounted in the passage, the opposite ends of the body having horizontal passages extending from the outer ends of said body to the transverse passage and opening thereinto, the opposite ends of the horizontal passages being flared, a U-shaped link having the legs thereof crossed and formed of spring material, a lateral finger at the end of each leg, each horizontal passage removably receiving a link, a fishing hook supported by one link, the fingers on the links being received by the inner flared end of its respective horizontal passage, and a hook suspended from the bottom of the body at one side of the transverse body.

VIOLET VAN BUREN.